United States Patent [19]

Wilson

[11] Patent Number: 5,772,441
[45] Date of Patent: Jun. 30, 1998

[54] VISUALLY REINFORCED LEARNING AND MEMORIZATION METHODS

[76] Inventor: Henry Allen Wilson, 7461 W. Belvedere Rd., West Palm Beach, Fla. 33411

[21] Appl. No.: 773,669

[22] Filed: Dec. 24, 1996

[51] Int. Cl.[6] .......................... G09B 19/00; G09B 25/06; G09B 27/08; G09B 29/10

[52] U.S. Cl. ...................... 434/236; 434/130; 434/131; 434/150; 434/433

[58] Field of Search .................................. 434/130, 131, 434/150, 153, 236, 433, 287; 283/34, 35, 36

[56] References Cited

U.S. PATENT DOCUMENTS

| | | |
|---|---|---|
| 1,054,276 | 2/1913 | Cahill . |
| 2,138,024 | 11/1938 | Cheesman . |
| 3,720,008 | 3/1973 | Hutar . |
| 4,345,902 | 8/1982 | Hengel ..................................... 434/170 |
| 4,402,672 | 9/1983 | Lowe, Jr. ............................. 434/153 X |
| 4,971,560 | 11/1990 | Patel ........................................ 434/191 |
| 5,018,976 | 5/1991 | Kuyath ..................................... 434/207 |
| 5,246,375 | 9/1993 | Goede ..................................... 434/236 |
| 5,275,568 | 1/1994 | Pfuetze .................................... 434/153 |
| 5,445,524 | 8/1995 | Jones ....................................... 434/153 |

*Primary Examiner*—Jeffrey A. Smith
*Attorney, Agent, or Firm*—Quarles & Brady

[57] ABSTRACT

A visually reinforced learning and memorization system combines the coordination of alphabetic mnemonics, number integers and colors to provide the user with multiple mechanisms for learning memorizing information. The memorization system is particularly suited for memorizing geographic information, which can be surveyed using a diamond-based coordinate system that can be subdivided to increasingly small points.

12 Claims, 8 Drawing Sheets

VISUALLY REINFORCED LEARNING AND MEMORIZATION METHODS

FIELD OF THE INVENTION

The invention relates to teaching aids. More particularly, the invention relates to teaching aids for assisting reading handicaps and memorization.

BACKGROUND OF THE INVENTION

Not all students are able to effectively and quickly memorize ideas and facts simply by having the idea described to them by a teacher. Most are able to cope with the word association system presently employed in the school systems; however, many cannot learn or remember in this manner.

In prior art systems, increasing memory and linguistic understanding has been accomplished through associating new information with established knowledge. Some mnemonic techniques have been utilized that coordinate consonant sounds with numbers to create the basis for word association. For example, "The Memory Book" by Harry Lorayne and Jerry Lucas discloses a "memory graph" to help a person remember locations as well as other information, based on letter/number combinations often used to help pinpoint a location on a map. Letters can be arranged down the left side of a map and numbers across the top to establish a letter/number combination. The memorization of the locations can be enhanced by creating a word to represent each location with a word beginning with the letter on the left side of the map with the next consonant following representing the number associated across the top of the map with all vowels ignored.

This system is limited in that it does not coordinate letters in a generally alphabetical order relative to numerical order. Also, the system is largely limited to non-visual memorization and can be difficult for those having underlying difficulties in understanding letters and numbers.

Systems have also been developed for coordinating letters with numbers. However, none have combined color coding with phonetics and numbers to provide a visual aid to memorize numeric and textual information and to assist those who have functional illiteracy challenges that may make reading text difficult or impossible.

SUMMARY OF THE INVENTION

It is accordingly an object of the invention to provide an improved system for memorizing information, and particularly geographic or numeric information, through visually reinforced mnemonics.

It is another object of the invention to provide a sight learning method for users having difficulties with numbers and letters.

It is also an object of the invention to provide multiple memorization cues to reinforce the memory of the underlying information.

It is yet another object of the invention to utilize a visually reinforced memorizing system for geographic information.

It is a further object of the invention to assign a specific coordinate to each surface area section of an organized globe for use with the memorization system.

It is still another object of the invention to provide a apparatus to assist in the creation of mnemonics by applying visual assistance of the memorizing system.

These and other objects of the invention are achieved by a visually reinforced learning and memorization system, which can include improved techniques and apparatus for assisting in using the system, and a geographic coordinate system for facilitating use of the system with earth or other geographies, and smaller regions as well.

The invention relates to a communication and learning system. In various embodiments, the invention has applications relating to advertising, educational teaching aids, telephone numbering, map organization, street signage, filing systems, organized store layouts and other areas in which a correlation of numbers, color and phonetics can be useful.

According to the invention, a coordinate system for providing numbering of various geographical locations, for example of the earth, can be provided to provide an organized numbering system down to areas as small as one square foot, or smaller. The resulting number reference for the geographic location can then be coordinated with the mnemonic system of the invention to provide a mechanism for not only providing an alphabetic representation of the numbers but also a color coordination to further visually reinforce the memory of the geographic reference number.

The use of the coordinate system and mnemonic system to teach memorization and geographic locations can further be enhanced through the use of a mnemonic apparatus generally comprising slide translators. Each slide translator can include a sleeve surrounding a slidable insert that reveals various information through a window in the sleeve. Each sleeve can be associated with a particular mnemonic group within the mnemonic set so as to bear a particular color, number and associated mnemonic subset. The translators can then be selected based on numbers to correspond to the individual digits of the reference numbers representing the geographic location and can then be arranged adjacent to each other to visually identify the letters in the construction of a mnemonic sentence or other phase for memorization of the associated numbers.

The application of the mnemonic system to memorize various spatial information can be extended to global coordinate systems and can include geography such as of the United States or smaller spacial areas. Various regions of the geographic area can also be colored according to the system.

The mnemonic system of the invention can also have other applications in which alphanumeric information must be memorized. The address of an individual, for example, can be colored and associated with particular phonetic groupings to create mnemonic sentences for memorization of the address. Similar approaches can be utilized for memorization of telephone numbers. Further, the mnemonic system can be selectively used within advertisements to color certain words or numbers to enable the viewer to construct mnemonic sentences with the associated phonetic group to memorize the particular advertising message conveyed by the advertisement.

Different aspects of the inventive system can be combined to provide further advantages. For example, the geography of an area, either a municipality, state, county, or continent can be organized according to the invention to identify specific location coordinates by number, color or both, combined with mnemonic cues corresponding to the number established for the location. The telephone numbers of individuals residing at the specific coordinate also can be selected to have the digits of the telephone number correspond to the area's geographical coordinate. Therefore, if one is able to memorize the telephone number of a residence, the actual location of the residence on the globe will simultaneously be memorized.

Thus, the invention provides method and apparatus for improving understanding and memorization, and particularly for geographic information. The learning aid can also be used for other non-educational applications to enable users familiar with the system to enjoy the benefits in various situations.

BRIEF DESCRIPTION OF THE DRAWINGS

A more detailed understanding of the invention can be gained by a reading of the following detailed discussion in connection with the accompanying drawings, in which.

DETAILED DESCRIPTION OF PREFERRED EMBODIMENTS

The invention is directed to various embodiments for improving learning and memorization of various information, particularly numeric and geographic information. The invention provides method and apparatus for generating numeric references for geographic locations down to selectively small sections, even smaller than one square foot. The method also provides a mnemonic system coordinating color numbers and phonetics to enhance the learning and memorization of numeric and geographic information. Apparatus is also proposed for facilitating the visualization of a geographic coordinate system and of mnemonics, reinforced by color and numeric coordination.

In accordance with the invention, in a preferred embodiment, a system is provided for subdividing and organizing a globe, ordering integers, colors and phonetics, and applying ordered integers, colors and phonetics to the organized globe to enhance memorization of geographic locations.

Figure 1A:
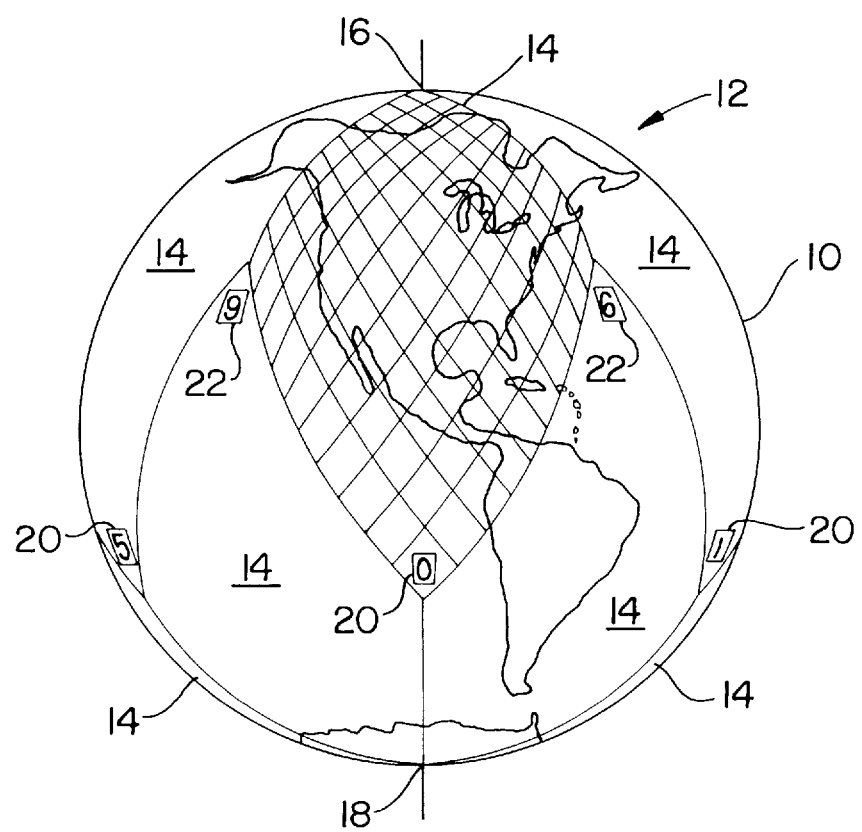
FIG. 1A is perspective view of an exemplary earth globe coordinated with a referencing system according to an aspect of the invention.

First, as shown in FIG. 1A, the surface area 10 of a globe 12 of a geographic body, preferably the Earth, is divided into ten equal rhombus or diamond surface areas 14. Each of these rhombus areas 14 can be referred to as a "decant 14." The decants 14 are organized such that the top of five decants preferably meet at a top pole point 16, such as the North Pole, and the bottom of the other five decants meet at a bottom pole point 18 diametrically opposite the top pole point 16, such as the South Pole.

The five northern decants 14 sequentially bear numbers 20 from 0 to 4. Similarly, the bottom five decants 14, beginning preferably with the decant immediately south and east of decant 0, when viewed from the equator, and continuing in a clockwise manner around the South Pole when viewed from the South Pole, bear numbers 22 successively 5 through 9. Thus, ten decants 14 bearing numbers 0–9 are provided.

The decants 14 and their number referencing 20, 22 can be provided on a physical globe model that can be used as a teaching aide. Alternatively, the decants 14 and their subdivisions, as discussed below, can be displayed on any visually perceptible medium, including paper, computer or television. For example, the information can be conveyed or displayed on charts or other paper-based material or can be displayed on a computer screen or other electronic displaying media.

Figure 1B:
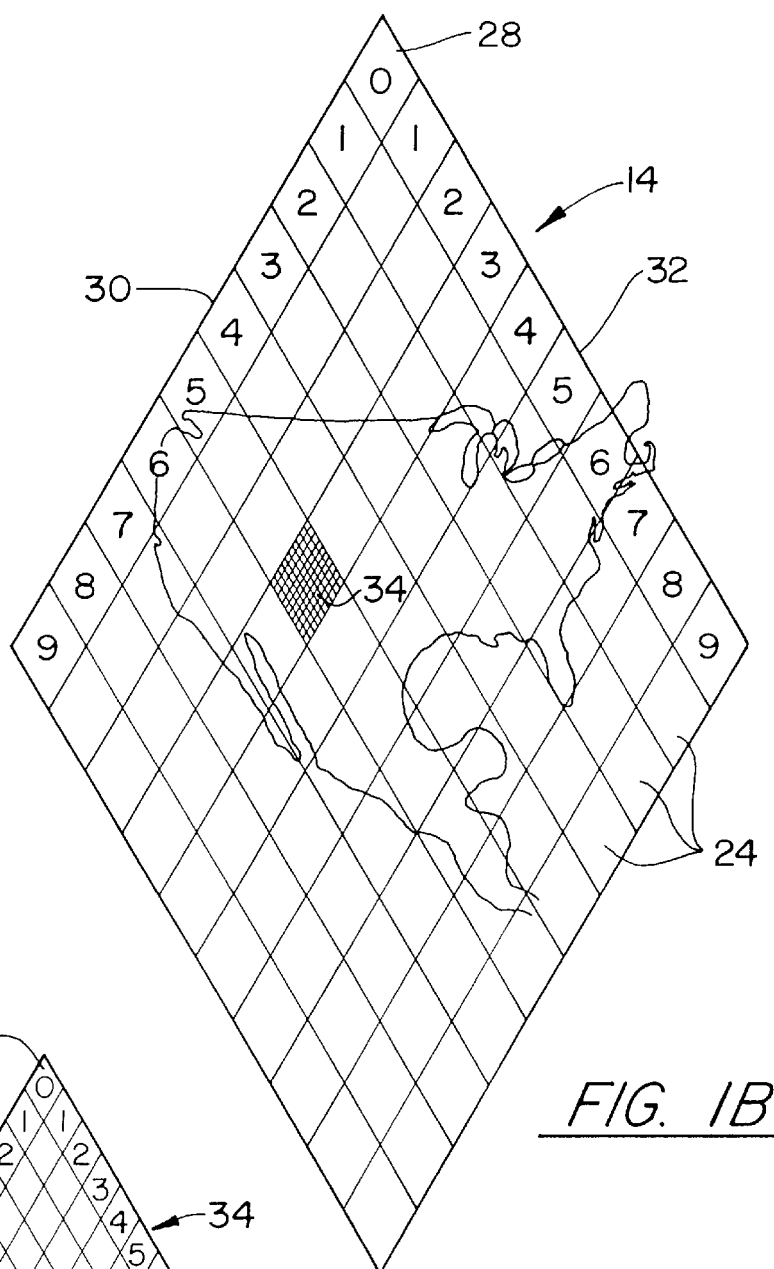
FIG. 1B is a plan view of an exemplary geographic display coordinated with the inventive referencing system.
Figure 1C:
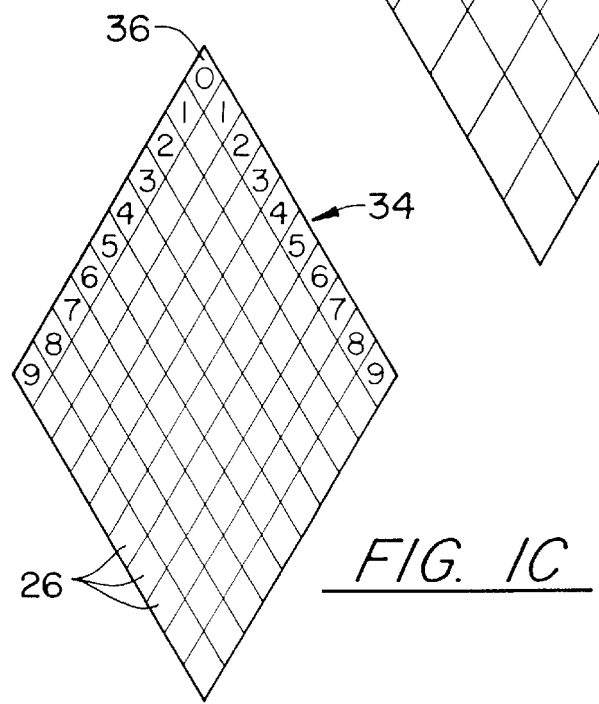
FIG. 1C is a further detail view of a section from the display of FIG. 1B.

As partially shown in FIG. 1B, each of the decants 14 is preferably subdivided into a hundred equal rhombus surface area "hectars 24." Each hectar 24 is preferably further subdivided as in FIG. 1C into a hundred equal rhombus surface area "sectors 26." Using these divisions, any sector 26 on the Earth, or any sector 26 on a surface map of the Earth, or other geography may be described in a series of five digits defining a sector coordinate.

The hectars 24 of each decant 14 can preferably be numbered with "0" in the uppermost diamond 28 and sequentially down the upper sides 30, 32 to number the diagonal rows and columns. Alternative numbering arrangements are also possible. Under this numbering system, each diamond hectar 24 can be identified by its row and column number as a two digit identifier. For example, the gridded hectar 34 can be identified as row "5" and column "3," or "53." This numbering system preferably provides consecutive and distinct reference numbers from left to right and from top to bottom in each decant 14.

The first one-digit number of the sector coordinate corresponds to the decant; the second two-digit number corresponds to the hectar; and the third two-digit number corresponds to the sector. If, for example, as shown in FIG. 1C which is an exploded view of hectar 34 from FIG. 1B, a geographical site 36 is in decant "0", hectar "53", sector "00", then the coordinate assigned to that geographical site 36 is 05300.

Figure 1D:
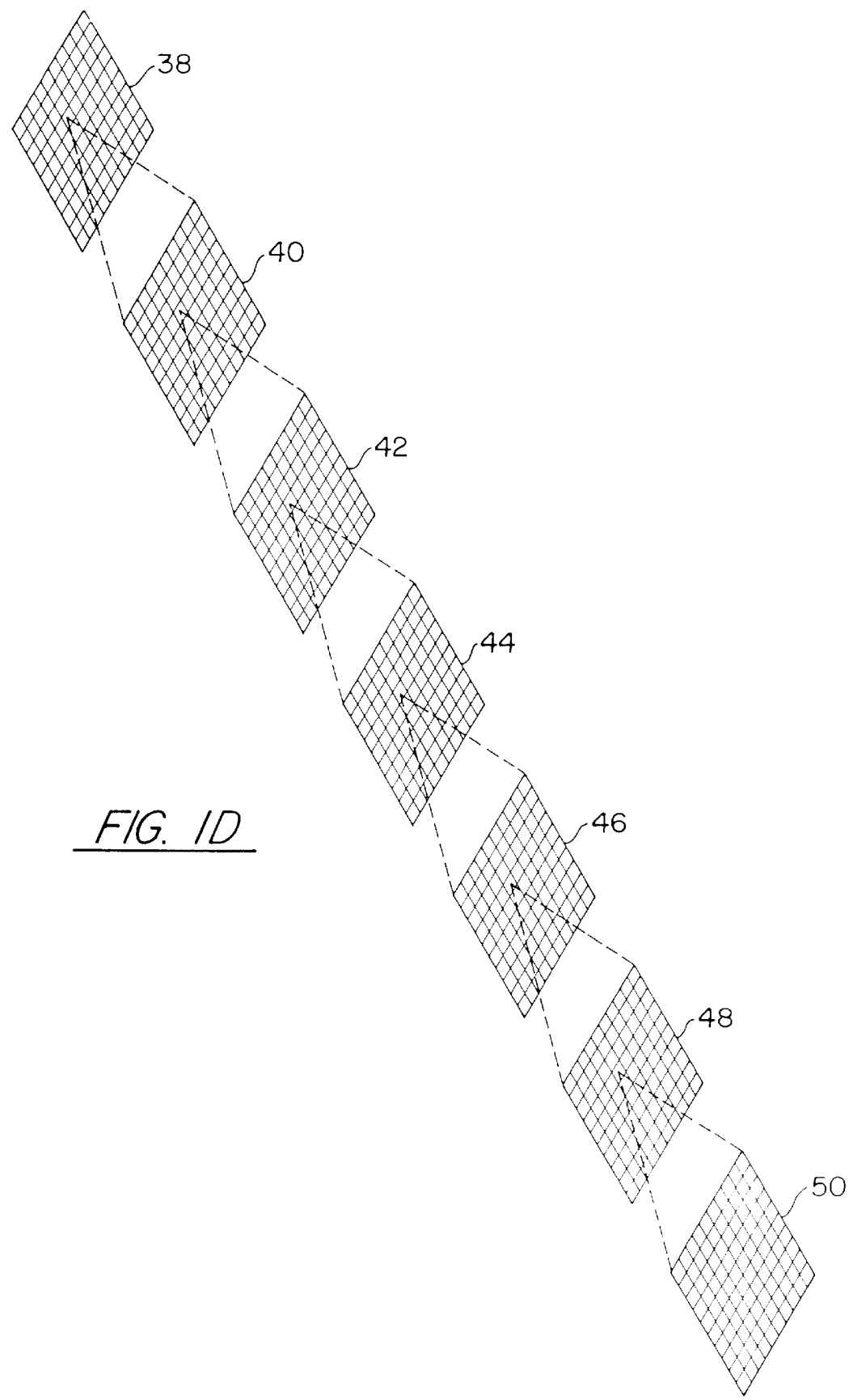
FIG. 1D illustrates a progression of successively smaller division displays utilizing the referencing system of the invention.

Referring to FIG. 1D, because each rhombus surface area division can always be further subdivided, the invention can be applied to describe areas for precision global mapping. Subsequent rhombus dividing in groups of 100 can be applied to areas as small as one square foot, or even smaller. Such precise measuring can, for example, be used in the mapping and labeling of real estate surveys for ownership boundaries and the like. The detailed referencing system can also be used for referencing the specific location of objects and individuals.

Precision mapping can be illustrated or otherwise displayed or represented by successively dividing the Earth into smaller units until the smallest unit area is a desired size, such as approximately twelve square inches. The surface area of the Earth is approximately 196,940,000 million square miles. Thus, each decant is 1.97 million square miles, each hectar is 196,940 square miles and each sector is 1,970 square miles. Each sector 38 can be subdivided into one hundred diamond or rhombus regions 40 of 19.7 square miles. Each region 40 can similarly be subdivided into one hundred rhombus districts 42 of 0.2 square miles or approximately 128 acres. Each district 42 can be broken down to one hundred tracts 44 of 1.28 acres, which can be divided into one hundred diamond lots 46 of 550 square feet. Further, each lot 46 can be similarly subdivided into one hundred rhombus cells 48 of 5.5 square feet, which can be subdivided into 100 diamond or rhombus spots 50 of 7.9 square inches.

Each of the multiple levels can be represented by a two digit number as discussed above.

Approximate sizing of Earth surface area divisions including those smaller than a sector unit is shown in the table below:

TABLE I

| Decant | 1.97M mi$^2$ |
|---|---|
| Hectar | 197,000 mi$^2$ |
| Sector | 1,970 mi$^2$ |
| Region | 1.97 mi$^2$ |
| District | 0.2 mi$^2$ |
| Tract | 1.3 acres |
| Lot | 560 ft$^2$ |
| Cell | 5.6 ft$^2$ |
| Spot | 8 in$^2$ |

Therefore, by successively applying the method for dividing the globe into rhombus surface areas, a seventeen digit number seventeen can pinpoint an 8 in$^2$ spot anywhere on the Earth. A thirteen digit reference can identify a 560 ft$^2$ lot and could be easily used as the address of the lot and further as the phone number of the residence located on the lot. Thus, an entire world real estate mapping system and world telephone number directory could be condensed into a single string of numbers, easily memorized by people and processed by computers.

The visually reinforced learning method can then be applied to easily memorize these integer number strings. In order to be able to easily memorize the specific coordinate for a geographical site and possibly the address and phone number, the invention provides a system in which each integer digit 0 through 9 is correlated to a color and is further correlated to a group of similar phonetic sounds. A preferred arrangement of the system is set forth in the following table:

TABLE II

| Digit | Color | Phonetics |
|---|---|---|
| 0 | Orange | S, Z, X (c); |
| 1 | Red | (A), B, P; |
| 2 | White | C, K, Q (ing); |
| 3 | Blue | D, T, Th; |
| 4 | Brown | F, V, Ph, W; |
| 5 | Black | (E), G, J, Sh, Ch, tion; |
| 6 | Pink | (I), L; |
| 7 | Purple | (O), M; |
| 8 | Yellow | (U), N; |
| 9 | Green | (Y), R. |

An example from the sector-based globe illustrates the creation of a mnemonic according to the invention. First, a five digit coordinate is selected from the sector-based globe. From the five digit coordinate, a five color group can be assigned to the geographical site by taking the integer in each of the 5 digit coordinates and assigning the corresponding color within each integer's mnemonic set and then ordering the colors in the same order as the coordinate numbers. From this, a five-color band is created which can be used to memorize the geographical coordinate. Alternatively or additionally, an ordered set of phonetics can be selected from the corresponding mnemonic sets comprising the five digit coordinate.

Figure 2:
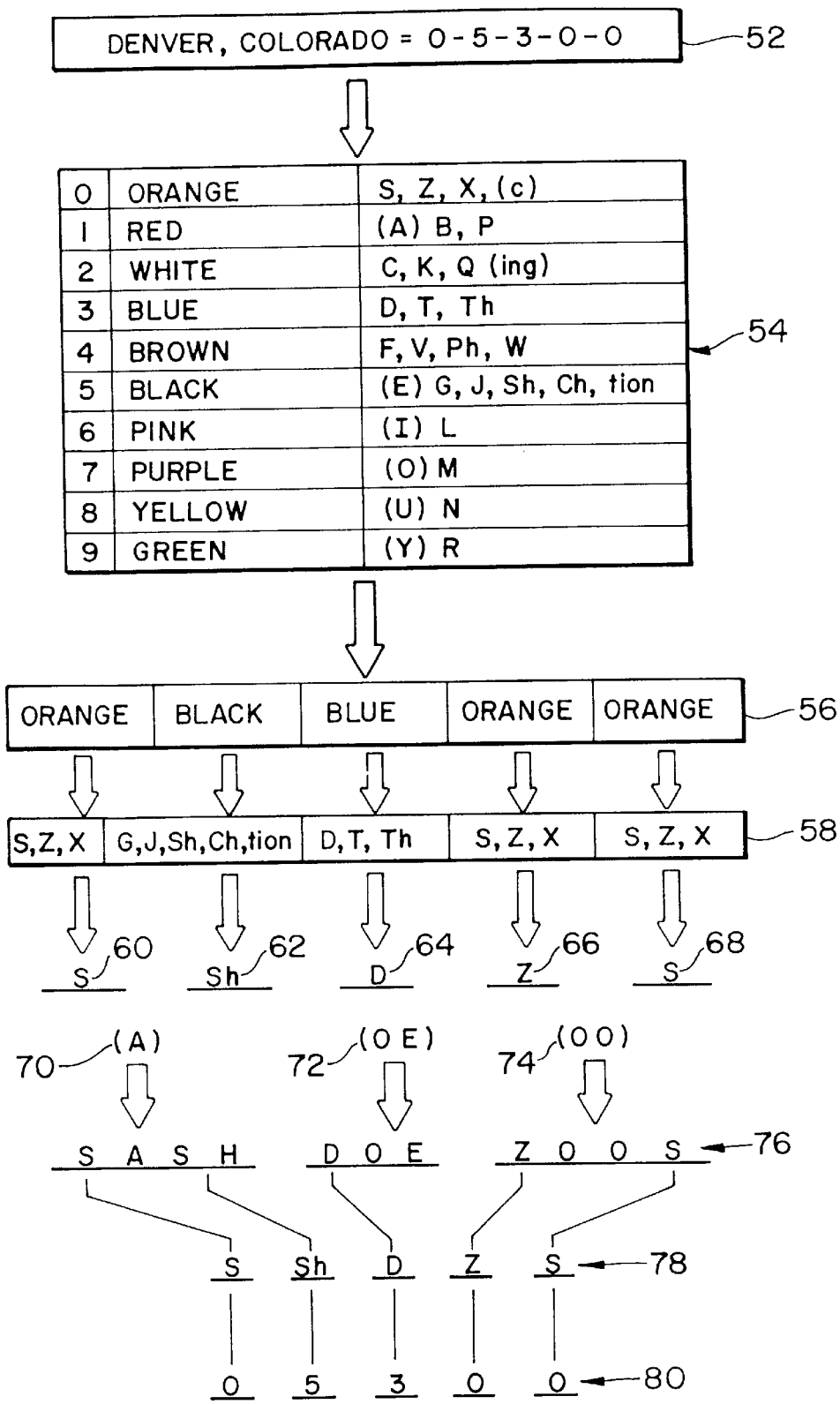
FIG. 2 is a table depicting an exemplary use of the mnemonic system of the invention to enhanced memorization of a geographic location.

Referring to FIG. 2, the system can be used to create a mnemonic for remembering the coordinate for a location 52, for example, Denver, Colo., corresponding to 05300, the mneumonic sets 54 can be used to select a corresponding five-color band 56 for the location 52 is orange, black, blue, orange, orange and the phonetic groups 58 for creating a mnemonic are as follows:

TABLE III

| 0 | S, Z, X; |
|---|---|
| 5 | G, J, Sh, Ch, tion; |
| 3 | D, T, Th; |
| 0 | S, Z, X; and |
| 0 | S, Z, X. |

Taking the first letters 60,62, 64,66,68 from all of these phonetic groups 58, and selectively inserting the vowel "a" 70 between the first letter 60 and second letter 62, the vowels "oe" 72 after the third letter 64, and the vowels "oo" 74 between the fourth letter 66 and fifth letter 68, the mnemonic "sa<u>sh</u> <u>d</u>oe <u>z</u>oo<u>s</u>" 76 can be created. Therefore, if the person applying the visually reinforced learning system of the invention memorizes and associates "sash doe zoos" with the site, the person, by utilizing the ten mnemonic sets, will always be able to decode "sash doe zoos" into "s-sh-d-z-s 78," which corresponds to the five-digit coordinate "05310" 80, on the sector based globe of the Earth corresponding to Denver, Colo.

As can be seen in the mnemonic set in TABLE II, mnemonic sets 0–9 are preferably arranged in a particular order and include items outside the typical set of phonetics. The phonetics available in the English language can be separated into ten groups as shown in TABLE II. To define a starting point of the phonetic organization in the preferred embodiment, the phonetics are assigned in a relatively alphabetical listing. There is also an additional element of the English language to be divided among the ten integer phonomes, namely, the vowels. Both the phonetics and the vowels are assigned to the integers beginning at integer 1 and ending at integer 0, keeping as close to alphabetical order as possible. Accordingly, the vowel "a" is assigned to 1. Next, going to the letter "b," the letter equivalents for the phonetics similar to the letter "b" are the letters "B" and "P." The next letter in the alphabet is "c" which has a phonetic equivalent of "K" and "Q" and is assigned to integer "2." The next letter is "d" which has the phonetic equivalent of "T" and "Th" and is assigned to integer 3. Skipping the vowel "e," the next letter is "f" which has the phonetic equivalent of "V," "Ph" and "W". The rest of the phonetics are assigned to integers 4 through 9 with the vowels "e," "i," "o," "u" and "y" assigned to the integers 5, 6, 7, 8 and 9, respectively. Additionally, the phonetics corresponding to "ing" and "tion" are assigned to integers 2 and 5, respectively.

In order to assist in the creation of a mnemonic, an apparatus for presenting each mnemonic set can be provided. A slide translator can be used to provide a visual representation of the color or mnemonic to assist in the creation of a color band or mnemonic to encode a coordinate of a geographical site.

Figure 3:
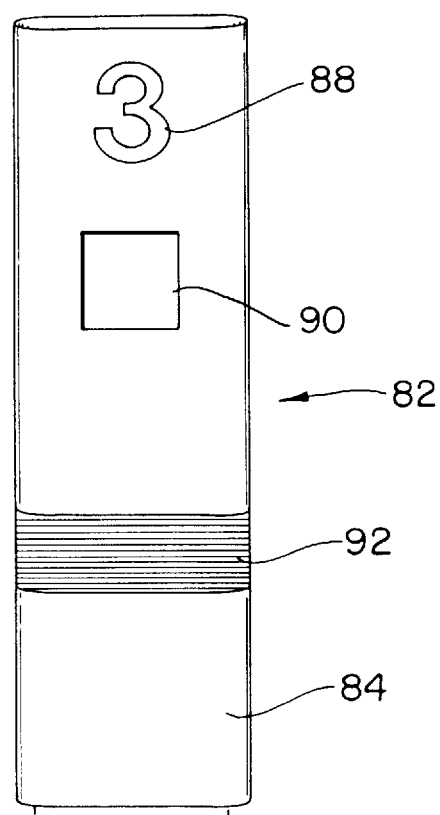
FIG. 3 is a front elevation view of an apparatus for facilitating mnemonic formulation under the inventive system.
Figure 3:
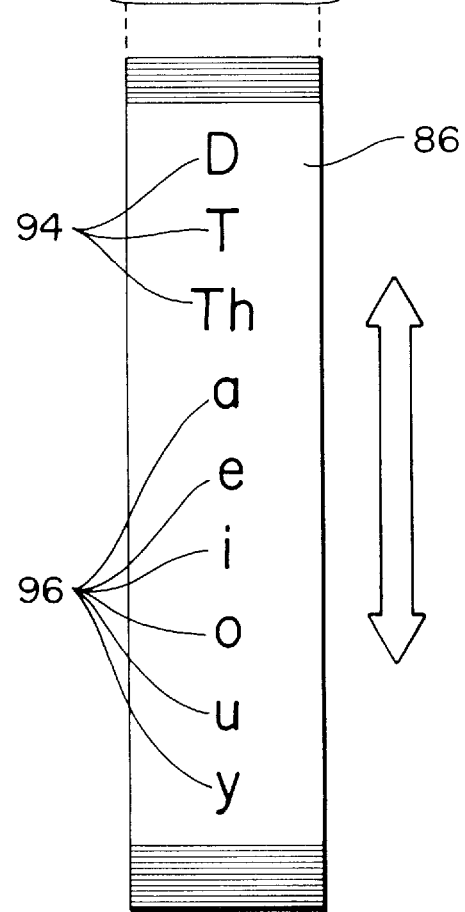

In a preferred embodiment shown in FIG. 3, a slide translator 82 can comprise a sleeve 84 and an insert 86. On the sleeve 84 can be drawn an integer from the 0–9 integers. The sleeve 84 can also have a window 90 for viewing information on the insert 86 placed slidingly therewithin. The sleeve 84 can be colored or partially bear color 92 of the mnemonic set associated with the integer 88 on the sleeve 84. On the insert 86, all of the phonetic letter equivalents 94, as stated in the mnemonic set in TABLE II above associated with the integer 88 can be provided along with a list of all vowels 96: "a", "e", "i", "o", "u" and "y". The insert 86 is preferably positioned within the sleeve 84 to permit placement of one of the phonetic letter equivalents 94 and vowels 96 within the sleeve window 90.

Figure 4:
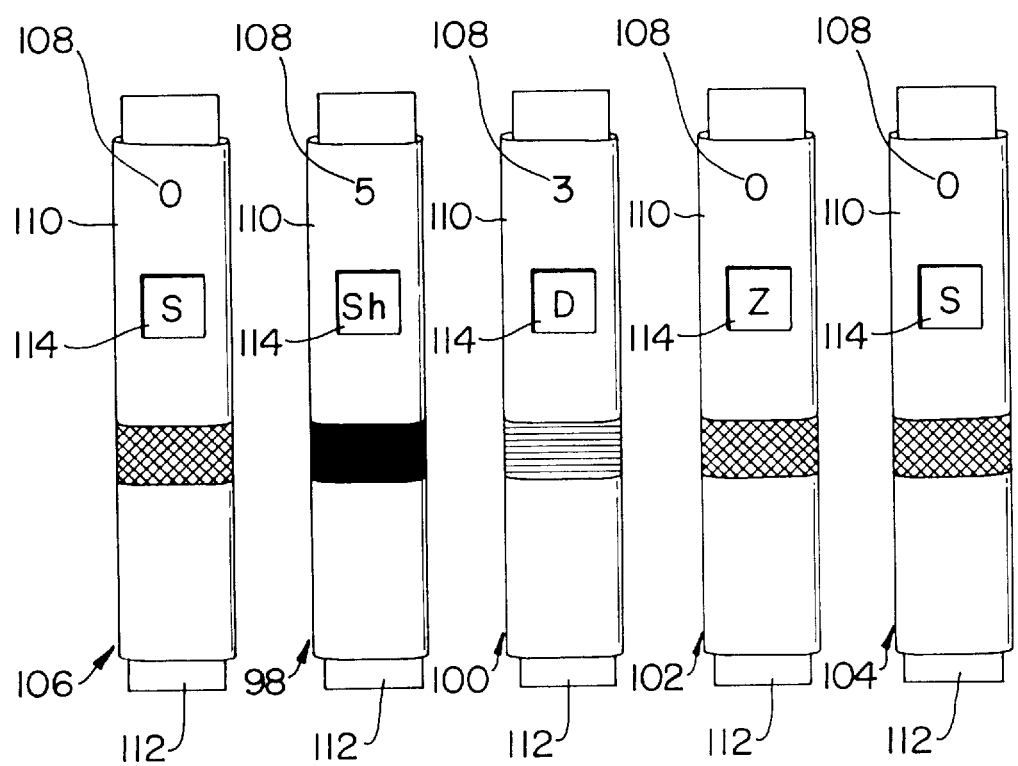
FIG. 4 is a further illustration of apparatus as shown in FIG. 3 in an exemplary application.

A plurality of these slide translators 82 can be arranged to equal the number of digits in the coordinate. For example, as shown in FIG. 4, if the user wishes to create a mnemonic from the geographic coordinate 05300, the user will look for one black 98, one blue 100, and three orange slide translators 102, 104, 106 from a collection of perhaps fifty of such translators. The slide translators 98, 100, 102, 104, 106 can then be arranged to place the integer 108 drawn on each sleeve 110, in the same order as the coordinate. The sleeves 110, thus organized, present the five-color band for that geographic coordinate.

In order to create the mnemonic, the inserts 112 can be manipulated within their respective sleeves 110 to allow the phonetic letter equivalents to appear in the sleeve window 114. In the "05300" example, for the first slide translator 106, the slide 112 can be moved to allow the letter "s" to appear in the sleeve window and, respectively, a "sh", "d", "s" and "s" can be aligned to the sleeve windows 114 of the other slide translators 98, 100, 102, 104.

Figure 5:
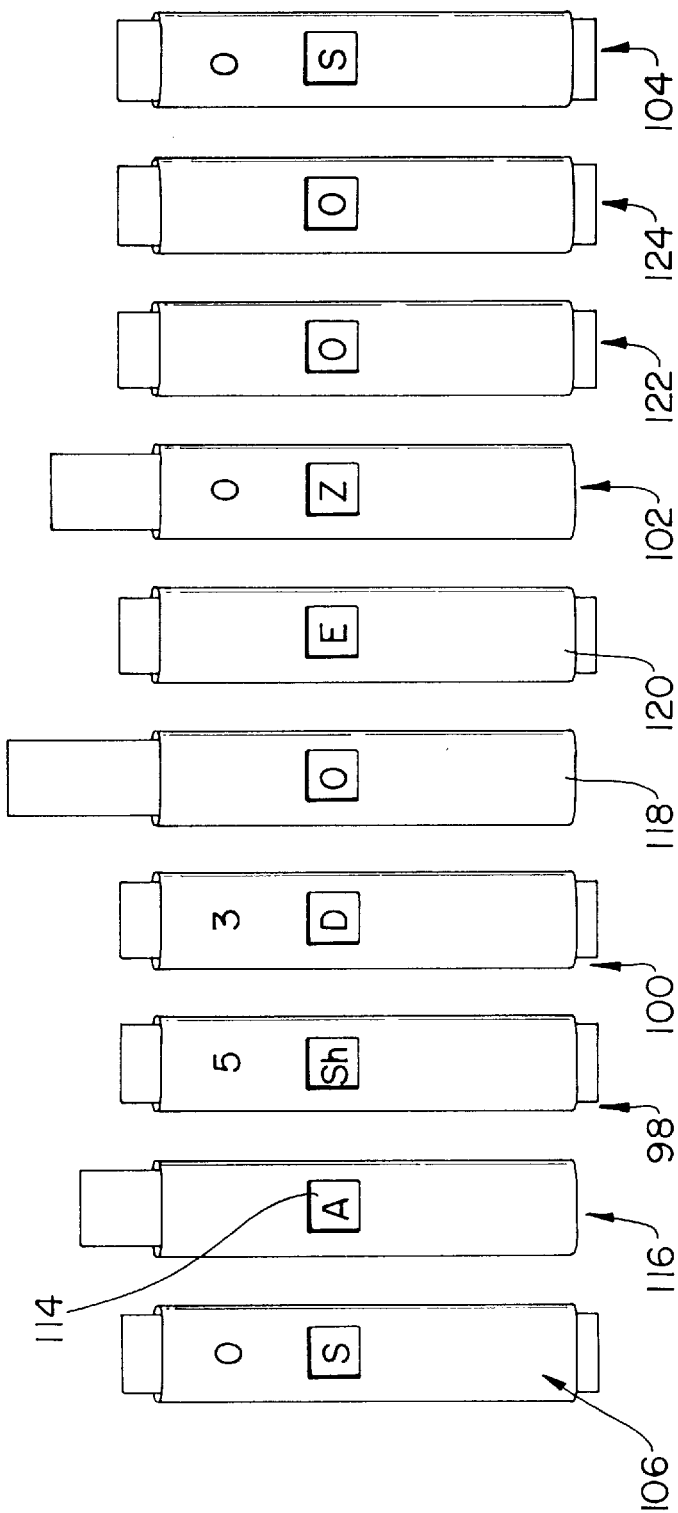
FIG. 5 is a further illustration of the apparatus as shown in FIG. 3 in a further exemplary application.

To create a complete mnemonic, other vowel translators preferably without associated numbers can be used to visually provide vowels between the five above mentioned translators by sliding a vowel into the window in the sleeve and then placing the vowel between any of the phonetic letter equivalents appearing in the five displayed translators. Accordingly, as shown in FIG. 5, the mnemonic "sash doe zoos" can be created by placing a slide translator 116 showing the letter "a" in its window 114 between the first 106 and second 98 translators, slide translators 118, 120 showing the letters "o" and "e" between the third 100 and fourth 102 translators, and translators 122, 124 showing the letters "o" and "o" between the fourth 102 and fifth 104 translators. This mnemonic can then be used to remember the coordinate location by memorizing all of the phonetic letter equivalents associated to each integer of the coordinate. By remembering that "sash doe zoos" is associated with the geographical site located at coordinate 05300, the user can decode the mnemonic by eliminating all the vowels and recreating the integer sequence from the remaining phonetic letter equivalents. The mnemonic is further reinforced by the color combination displayed by the system.

This system can also be applied to other spherically measured locations. For example, the system can be used in stellar cartography. In this embodiment, the pole of the stellar cartographic projection can be organized along the axis perpendicular to the plane of the Earth orbiting the Sun and the stars can be mapped from the perspective of the Sun along the inside of the surface area of a sphere. The sphere can be divided into decants, hectars and sectors for a five-coordinate sector-based interior-displayed globe, and this globe can be used as a low resolution device to enable one to learn the locations of significant stars and astronomical bodies, for example, the stellar constellations. The globe can also model other bodies such as the moon or other solar planets.

The visually reinforced memorization system according to the invention can also be utilized in connection with teaching aides and displays for conveying spacial information, such as geographic maps. For example, a map of the United States can be divided into ten regions and colored according to the mnemonic set as shown in TABLE II. Students can then be provided with additional tools in the form of color and phonetic sets to remember important information relating to the regions. Similarly, store layouts could be organized into departments that are color coded according to the mnemonic sets to provide learning disabled customers to remember the location of products with additional clues provided by color and phonetic sets.

Figure 6:
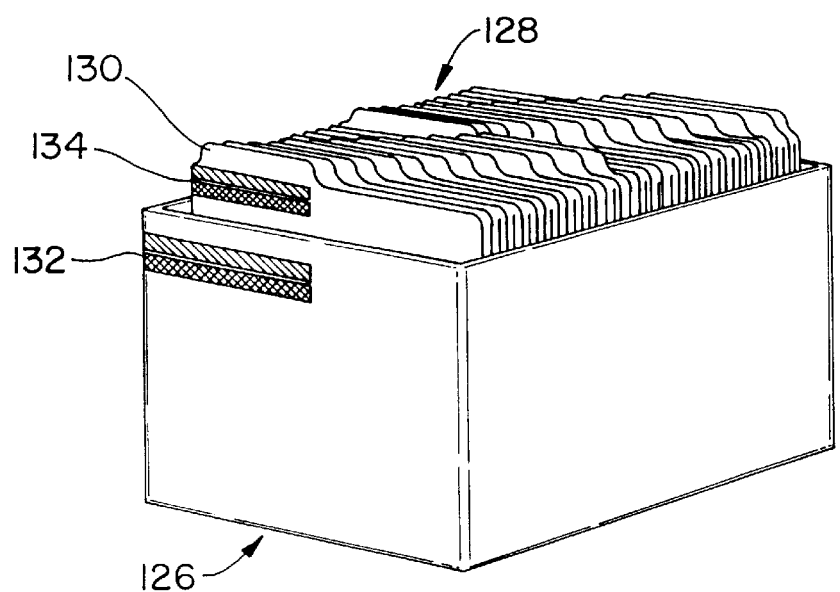
FIG. 6 is a filing system using the mnemonic system of the invention.

The learning and memorization system can also have application for organizing documents, such as evidence and other important materials for a legal case to be presented at a trial. In such application, an embodiment can include a series of bins such as a bin 126 shown in FIG. 6 that are colored according to the system.

Each bin 126 contains a filing system 128. The subject matter of each folder 130 can provide a label for coding according to the colors of the system. The bin 126 can bear a color 132 for the first or second or both consonant of the title of the subject matter. Each folder 130 preferably bears colors 134 corresponding to the next consonants of the title of the subject matter. Some folders may be colored a solid color. Other folders may have a two colors, preferably the primary color for the second consonant and a stripe of another color for the third consonant. The folders could have multiple stripes for additional consonants.

A textual label of the subject matter could also be provided for verification and the like, but the color coding enables quick location without closely reading labels. Alternatively, the textual labels could be left off so that the file content is not readily known to unauthorized viewers but rather is only identified through the color based organizational system. An extra bin can be provided for receiving folders after use for later refiling in the appropriate colored bin.

Figure 7:
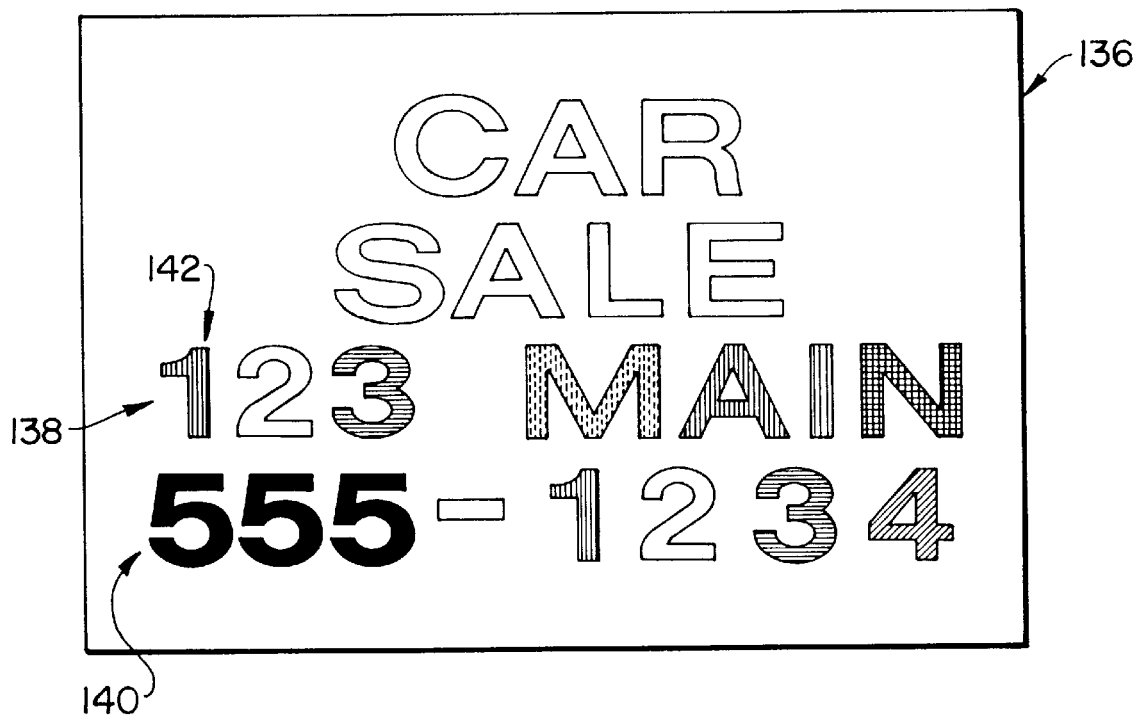
FIG. 7 is an exemplary alphanumeric message enhanced with colorization from the memorization system of the invention.

Referring to FIG. 7, the color-based communication system also enables memorization of telephone numbers and words, such as for advertising, in which the wording and the corresponding phone number are colorized to further increase the memorization of the advertising message and the business phone number. For example, an advertisement 136 can include a message 138 which is colorized according to the system and the visual reference of the color can help a functionally illiterate viewer to recall the number by use of the color based memorization system.

The memorization and learning system according to the invention can also be used to further emphasize the message conveyed by advertising to reinforce memorization of the advertising message. Critical portions of the advertisement 136 such as the phone number 140 and the store address 142 can be colored according to the coding under the coordination system.

Details for making and using a number of implementations of the invention have been set forth above with particularity. Alternative embodiments may now be apparent to one skilled in the art in view of this disclosure. For example, the memorization system can have application for street numbers, wherein the associated color under the system can be used to color the number of the street address as a background for the digit so that user can readily identify and remember an address by the color in addition to, or as an alternative to, the number itself. It is therefore intended that the scope of the invention be determined by the following claims and not by the examples set forth in the specification.

I claim:

1. A method for visually reinforcing the teaching and memorization of geographic locations on a globe, said method comprising the steps of:

providing a globe bearing geographic information of the Earth, said globe having surface lines dividing said globe into ten rhombus shapes, said ten rhombus shapes being substantially equal in area, each of said ten rhombus shapes defining a decant, each decant having surface lines dividing it into 100 substantially equal rhombus hectars, each hectar having surface lines dividing it into 100 substantially equal rhombus sectors;

a top corner of five of said decants meeting at a top pole point of the globe and a bottom corner of the other five of said decants meeting at a bottom pole point of the globe substantially diametrically opposite the top pole point;

wherein each of said decants bears numbering consecutively and distinctly from 0 to 9, said decants bearing 0 to 4 being placed consecutively on a top section of the globe such that the top corners of said decants bearing 0 to 4 connect at the top pole point, said decants bearing 5 to 9 being consecutively placed around a bottom section of said globe;

each of said hectars bearing numbers consecutively and distinctly from 00 to 99;

each of said sectors bearing numbers consecutively and distinctly from 00 to 99;

each decant, hectar and sector bearing on a portion of its surface a color corresponding to the number it bears according to the following table of mnemonic sets:

| Digit | Color  | Phonetics              |
|-------|--------|------------------------|
| 0     | Orange | S, Z, X (c);           |
| 1     | Red    | (A) B P;               |
| 2     | White  | C K Q (ing);           |
| 3     | Blue   | D T Th;                |
| 4     | Brown  | F V Ph W;              |
| 5     | Black  | (E) G J, Sh, Ch, tion; |
| 6     | Pink   | (I) L;                 |
| 7     | Purple | (O) M;                 |
| 8     | Yellow | (U) N; or              |
| 9     | Green  | (Y) R; and             | displaying on a visually perceptible medium a geographic location from said globe by a five-digit coordinate corresponding to the numbering of a decant-hectar-sector including said location, whereby the geographic location can be identified through color coordination and mnemonic labeling.

2. The method according to claim 1, wherein the hectars of each decant bear said numbers consecutively from left to right and top to bottom within said decant; and the sectors of each hectar bear said numbers consecutively from left to right and top to bottom within said hectar.

3. A method for visually reinforcing the teaching and memorization of geographic locations on a globe, said method comprising the steps of:

providing a globe bearing geographic information of the Earth, said globe having surface lines dividing said globe into ten rhombus shapes, said ten rhombus shapes being substantially equal in area, each of said ten rhombus shapes defining a decant, each decant having surface lines dividing it into 100 substantially equal rhombus hectars, each hectar having surface lines dividing it into 100 substantially equal rhombus sectors;

a top corner of five of said ten decants meeting at a top pole point of the globe and a bottom corner of the other five of said ten decants meeting at a bottom pole point of the globe substantially diametrically opposite the top pole point;

wherein said decants bear numbering consecutively and distinctly from 0 to 9, said decants bearing 0 to 4 being placed consecutively on a top section of the globe such that the top corners of said decants bearing 0 to 4 connect at the top pole point, said decants bearing 5 to 9 being consecutively placed around a bottom section of said globe;

each of said hectars bearing numbers consecutively and distinctly from 00 to 99;

each of said sectors bearing numbers consecutively and distinctly from 00 to 99;

each decant, hectar and sector bearing on a portion of its surface a color corresponding to the number it bears according to the following table of mnemonic sets:

| Digit | Color  | Phonetics              |
|-------|--------|------------------------|
| 0     | Orange | S, Z, X (c);           |
| 1     | Red    | (A), B, P;             |
| 2     | White  | C, K, Q (ing);         |
| 3     | Blue   | D, T, Th;              |
| 4     | Brown  | F, V, Ph, W;           |
| 5     | Black  | (E), G, J, Sh, Ch, tion; |
| 6     | Pink   | (I), L;                |
| 7     | Purple | (O), M;                |
| 8     | Yellow | (U), N; or             |
| 9     | Green  | (Y), R;                | displaying on a visually perceptible medium a geographic location from said globe by a five-digit coordinate corresponding to the numbering of a decant-hectar-sector including said location;

providing a plurality of slide translators, each of said slide translators having a sleeve and a slidable insert, each of said slide translators bearing at least a color and a digit from one of said mnemonic sets on its sleeve, its insert bearing letters of said one of said mnemonic sets and a list of vowels;

arranging a series of slide translators adjacent each other, each slide translator of the series bearing the mnemonic set corresponding to a digit of the coordinate for said location; and sliding an insert within a sleeve of each slide translator to present a letter to assist in forming a mnemonic for memorizing the coordinate.

4. A method for visually reinforcing the teaching and memorization of locations on a map, said method comprising the steps of:

displaying on a visually perceptible medium geographic information overlayed at least partially by surface lines divided into ten rhombus shapes, said ten rhombus shapes being substantially equal in area, each of said ten rhombus shapes defining a decant, each decant having surface lines dividing it into 100 substantially equal rhombus hectars, each hectar having surface lines dividing it into 100 substantially equal rhombus sectors;

each of said decants bearing numbering consecutively and distinctly from 0 to 9;

each of said hectars bearing numbers consecutively and distinctly from 00 to 99;

each of said sectors bearing numbers consecutively and distinctly from 00 to 99;

each decant, hectar and sector bearing on a portion of its surface a color corresponding to the number it bears according to the following table of mnemonic sets:

| Digit | Color  | Phonetics              |
|-------|--------|------------------------|
| 0     | Orange | S, Z, X (c);           |
| 1     | Red    | (A), B, P;             |
| 2     | White  | C, K, Q (ing);         |
| 3     | Blue   | D, T, Th;              |
| 4     | Brown  | F, V, Ph, W;           |
| 5     | Black  | (E), G, J, Sh, Ch, tion; |
| 6     | Pink   | (I), L;                |
| 7     | Purple | (O), M;                |
| 8     | Yellow | (U), N; or             |
| 9     | Green  | (Y), R; and            | displaying on a visually perceptible medium a geographic locations by a five-digit coordinate corresponding to the numbering of the decant-hectar-sector including said location, whereby the geographic location can be identified through color coordination and mnemonic labeling.

5. The method according to claim 4, wherein the visually perceptible medium is one of television, computer and paper.

6. The method according to claim 4, wherein the spacial information is a geographic map.

7. The method according to claim 6, wherein the geographic map is a representation of the United States.

8. A method for visually reinforcing memorization of alphanumeric information, said method process comprising the step of displaying alphanumeric information on a visually perceptible medium, wherein each letter and number of the alphanumeric information bears a corresponding color according to the table of mnemonic sets:

| Digit | Color  | Phonetics              |
|-------|--------|------------------------|
| 0     | Orange | S, Z, X (c);           |
| 1     | Red    | (A), B, P;             |
| 2     | White  | C, K, Q (ing);         |
| 3     | Blue   | D, T, Th;              |
| 4     | Brown  | F, V, Ph, W;           |
| 5     | Black  | (E), G, J, Sh, Ch, tion; |
| 6     | Pink   | (I), L;                |
| 7     | Purple | (O), M;                |
| 8     | Yellow | (U), N; or             |
| 9     | Green  | (Y), R.                |

9. The method according to claim 8, wherein the alphanumeric information is a telephone number.

10. The method according to claim 8, wherein the alphanumeric information is a street address.

11. The method according to claim 8, wherein the alphanumeric information is a portion of an advertisement.

12. The method according to claim 8, wherein the visually perceptible medium is one of television, computer and paper.

* * * * *